(12) United States Patent
Nie et al.

(10) Patent No.: US 12,321,227 B2
(45) Date of Patent: Jun. 3, 2025

(54) DATA PROCESSING METHOD AND DEVICE, AND DATA TRANSMISSION SYSTEM

(71) Applicant: Huawei Technologies Co., Ltd., Shenzhen (CN)

(72) Inventors: Er Nie, Shenzhen (CN); Jian Guo, Shenzhen (CN); Kun Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/462,497

(22) Filed: Sep. 7, 2023

(65) Prior Publication Data

US 2023/0418704 A1     Dec. 28, 2023

Related U.S. Application Data

(63) Continuation of application No. PCT/CN2021/079507, filed on Mar. 8, 2021.

(51) Int. Cl.
  *G06F 11/10*     (2006.01)
  *H04L 1/00*      (2006.01)

(52) U.S. Cl.
  CPC ............ *G06F 11/10* (2013.01); *H04L 1/0009* (2013.01); *H04L 1/0025* (2013.01); *H04L 1/0041* (2013.01)

(58) Field of Classification Search
  CPC ...... G06F 11/10; H04L 1/0009; H04L 1/0025; H04L 1/0041
  USPC ......................................... 714/758, 764, 774
  See application file for complete search history.

(56) References Cited

U.S. PATENT DOCUMENTS

| | | | |
|---|---|---|---|
| 8,433,969 B1 * | 4/2013 | Wu | H03M 13/353 714/751 |
| 2014/0258813 A1 * | 9/2014 | Lusted | H04L 1/004 714/776 |
| 2019/0324439 A1 * | 10/2019 | Cella | G06N 3/049 |
| 2020/0153548 A1 | 5/2020 | Lusted | |
| 2020/0226018 A1 * | 7/2020 | Das Sharma | G06F 11/10 |
| 2023/0418704 A1 * | 12/2023 | Nie | H04L 1/0041 |

FOREIGN PATENT DOCUMENTS

| | | |
|---|---|---|
| CN | 1732639 A | 2/2006 |
| CN | 107483144 A | 12/2017 |
| CN | 109150422 A | 1/2019 |

* cited by examiner

*Primary Examiner* — John J Tabone, Jr.
(74) *Attorney, Agent, or Firm* — Slater Matsil, LLP

(57) ABSTRACT

This application provides a data processing method, a device, and a data transmission system. The method includes: A first device determines a first mode from a plurality of error detection and correction modes based on an obtained first status parameter of a data link. Then, the first device may indicate a second device to use the first mode for encoding, the first device may use the first mode for decoding, thereby implementing error detection and correction of transmitted data. In the method provided in this embodiment of this application, the first device and the second device may support a plurality of error detection and correction modes, and the first device may determine a used error detection and correction mode based on a status parameter of the data link.

21 Claims, 5 Drawing Sheets

DATA PROCESSING METHOD AND DEVICE, AND DATA TRANSMISSION SYSTEM

CROSS-REFERENCE TO RELATED APPLICATIONS

This application is a continuation of International Application No. PCT/CN2021/079507, filed on Mar. 8, 2021. The disclosure of the aforementioned application is hereby incorporated by reference in its entirety.

TECHNICAL FIELD

This application relates to the field of communication technologies, and in particular, to a data processing method and device, and a data transmission system.

BACKGROUND

When data is transmitted between devices, an error may occur in a signal of the transmitted data due to the influence of transmission conditions. As a result, a bit error occurs in the data received by a receiving end.

In a related technology, a transmitting end uses a forward error correction (FEC) mode to encode to-be-transmitted data, and the receiving end correspondingly uses the FEC mode to decode and correct the received data, thereby reducing a bit error rate (BER) of the data. The BER is an indicator used to measure the degree of a bit error of the data.

However, an existing data error correction solution is single and has poor flexibility.

SUMMARY

To resolve a problem that an existing data error correction solution is single and has poor flexibility, this application provides a data processing method and device, and a data transmission system. The technical solution is as follows.

According to a first aspect, a data processing method is provided. The method includes: first, a first device obtains a first status parameter of a data link between the first device and a second device, and determines a first mode from a plurality of error detection and correction modes based on the first status parameter. Then, the first device sends a first indication to the second device, and decodes data by using the first mode. The first indication indicates to the second device to encode data by using the first mode.

The first device may determine the first mode based on the obtained first status parameter of the data link. Then, the first device may indicate the second device to perform encoding by using the first mode, and the first device performs decoding by using the first mode, thereby implementing error detection and correction of transmitted data. In the method provided in this embodiment of this application, the first device and the second device may support a plurality of error detection and correction modes, and may determine a used error detection and correction mode based on the status parameter of the data link, so that application of the error detection and correction technology is more flexible.

Optionally, the plurality of error detection and correction modes are in a one-to-one correspondence with a plurality of parameter ranges, and that the first device determines a first mode from the plurality of error detection and correction modes based on the first status parameter includes: The first device determines, from the plurality of parameter ranges, a first parameter range within which the first status parameter falls. The first device determines that an error detection and correction mode corresponding to the first parameter range is the first mode.

Different parameter ranges correspond to different error detection and correction modes, so that an error detection and correction mode selected during data transmission is relatively appropriate, and no waste of error correction performance or insufficient error correction capability is caused.

Optionally, after the decoding data by using the first mode, the first device may obtain a second status parameter of the data link. When the second status parameter is beyond the first parameter range, the first device may determine a second parameter range within which the second status parameter falls in the plurality of parameter ranges, and determine that an error detection and correction mode corresponding to the second parameter range is a second mode. Then, the first device may send a second indication to the second device, where the second indication indicates to the second device to encode the data by using the second mode. In addition, the first device switches the first mode to the second mode, and decodes the data by using the second mode.

When the second status parameter of the data link is beyond the first parameter range, it indicates that the currently used error detection and correction mode does not match the status of the data link. The first device switches the currently used first mode to the second mode that matches the status of the current data link, which can ensure that the data error correction capability is sufficient and does not cause a waste of the error correction capability.

Optionally, before the decoding the data by using the second mode, the first device may receive a response sent by the second device to the second indication, where the response to the second indication indicates whether the second device is allowed to use the second mode to encode the data. The first device switches the first mode to the second mode when the response to the second indication indicates that the second device is allowed to use the second mode.

Before switching the error detection and correction mode, the second device needs to negotiate with the first device, to ensure that both parties are allowed to use the error detection and correction mode, and flexibility is better.

Optionally, before the determining a first mode from a plurality of error detection and correction modes based on the first status parameter, the first device may receive first capability information sent by the second device, where the first capability information indicates an error detection and correction mode supported by the second device. Then, the first device may determine the plurality of error detection and correction modes based on the first capability information and an error detection and correction mode supported by the first device. The plurality of error detection and correction modes belong to error detection and correction modes supported by both the first device and the second device.

The first device determines, based on an indication of capability information of the second device, a plurality of error detection and correction modes supported by both parties, to ensure that no error occurs during subsequent selection of the error detection and correction mode through negotiation, and to ensure that both the first device and the second device support the mode determined by the first device based on the status parameter of the data link.

Optionally, before the decoding data by using the first mode, the first device may receive a response sent by the second device to the first indication, where the response to the first indication indicates whether the second device is allowed to use the first mode to encode the data. The first device may decode the data by using the first mode when the response to the first indication indicates that the second device is allowed to use the first mode.

The first device decodes the data by using the first mode only when the second device is allowed to use the first mode to encode the data, to ensure that a mode used for encoding is consistent with that used for decoding.

Optionally, before the obtaining a first status parameter of a data link between the first device and a second device, the first device may receive a message that is sent by the second device and that includes first check information. Then, the first device may obtain the first status parameter based on the first check information.

Before transmitting service data, the first device detects the first status parameter of the current data link by transmitting the message that carries the first check information.

Optionally, before the decoding data by using the first mode, the first device may receive encoded data that is sent by the second device and that is obtained by encoding the data by using the first mode, where the encoded data carries second check information. Then, the first device may decode the encoded data by using the first mode, and obtain the second status parameter based on the second check information carried in the encoded data.

In a service data transmission process, the first device detects the second status parameter in the service data transmission process through the second check information carried in a service data stream.

Optionally, before the obtaining a first status parameter of a data link between the first device and a second device, the first device may receive a message that is sent by the second device and that includes first check information, so that the first device can obtain a first status parameter based on the first check information. Before the determining a first mode from a plurality of error detection and correction modes based on the first status parameter, the first device may further receive a message that is sent by the second device and that includes first capability information, where the first capability information indicates an error detection and correction mode supported by the second device. Further, the first device may determine the plurality of error detection and correction modes based on the first capability information and an error detection and correction mode supported by the first device. The plurality of error detection and correction modes belong to error detection and correction modes supported by both the first device and the second device. Before the decoding data by using the first mode, the first device may receive a message that is sent by the second device and that includes a response to the first indication, where the response to the first indication indicates whether the second device is allowed to use the first mode to encode the data. In this way, the first device can decode the data by using the first mode when the response to the first indication indicates that the second device is allowed to use the first mode. The first device may send a message including the first indication to the second device. The first device may further send a message including the second indication to the second device. The first device may further receive a message that is sent by the second device and that includes the response to the second indication. The message includes: a capability field, a control field, and a check field. The capability field is used to carry the first capability information. The control field is used to carry the first indication, the response to the first indication, the second indication, or the response to the second indication. The check field is used to carry the first check information.

The first check information, the first capability information, the first indication, the response to the first indication, the second indication, or the response to the second indication may all be carried in a message for transmission, and formats of messages used to carry the foregoing content may be the same. If the messages in the same format are used, complexity of reading the messages by the first device and the second device during negotiation can be reduced.

Optionally, the message includes a training set block (TSB) message.

The first device and the second device may be devices that use the PCIE technology. Information such as the first check information, the first capability information, the first indication, the response to the first indication, the second indication, or the response to the second indication is carried by using the TSB message transmitted in the link training phase, so that complexity of information interaction can be reduced.

Optionally, the first status parameter includes: a pre-correction bit error rate.

Optionally, the error detection and correction mode includes an FEC mode.

According to a second aspect, another data processing method is provided. The method includes: A second device receives a first indication sent by a first device, where the first indication indicates to the second device to encode data by using a first mode. The second device encodes the data by using the first mode based on the first indication.

The second device encodes the data by using the first mode based on an indication of the first device, to ensure consistency between an encoding mode and a decoding mode.

Optionally, after the encoding the data by using the first mode, the second device may receive a second indication sent by the first device, where the second indication indicates to the second device to encode the data by using a second mode. The second device may switch the first mode to the second mode, and encode data by using the second mode.

The second device encodes the data by using the second mode based on the indication of the first device, to ensure the consistency between the encoding mode and the decoding mode.

Optionally, before the encoding the data by using the second mode, the second device may determine, based on a mode selection condition, whether the second mode is allowed to be used to encode the data. The second device may send a response to the second indication to the first device, where the response to the second indication indicates whether the second device is allowed to use the second mode to encode the data. The second device may switch the first mode to the second mode when it is determined that the second mode is allowed to be used to encode the data.

There are many factors that affect a bit error rate of the data link. The second device needs to select, with reference to an actual situation of the data link, an error detection and correction mode used during data encoding. Switching is only performed when the situation of the data link allows the use of the second mode.

Optionally, before the encoding the data by using the second mode, the second device may send first capability information to the first device, where the first capability information indicates an error detection and correction mode supported by the second device.

The second device notifies the first device of the error detection and correction mode supported by the second device, to ensure that error detection and correction modes determined by the first device are error detection and correction modes supported by both parties, and to ensure that no error occurs when the error detection and correction mode is selected through subsequent negotiation.

Optionally, before the encoding the data by using the first mode, the second device may determine, based on the mode selection condition, whether the first mode is allowed to be used to encode the data. Then, the second device may send a response to the first indication to the first device, where the response to the first indication indicates whether the second device is allowed to use the first mode to encode the data. Further, the second device may encode the data by using the first mode when determining that the first mode is allowed to be used to encode the data.

There are many factors that affect a bit error rate of the data link. The second device needs to select, with reference to an actual situation of the data link, an error detection and correction mode used during data encoding. The data is encoded by using the first mode only when the situation of the data link allows the use of the first mode. In addition, the first device needs to be notified whether the first mode is allowed to be used, to avoid inconsistency between a mode used for encoding and a mode used for decoding.

Optionally, before the receiving a first indication sent by a first device, the second device may send a message including first check information to the first device.

The second device sends the message including the first check information to the first device, to measure a status parameter of the current data link.

Optionally, after the encoding the data by using the first mode, the second device may send encoded data that is obtained by encoding the data by using the first mode to the first device, where the encoded data carries second check information.

When transmitting the service data, the second device carries the second check information to the encoded data, where the second check information is used to measure a status parameter of the data link when the service data is transmitted.

Optionally, before the receiving a first indication sent by a first device, the second device may send a message including first check information to the first device. Before the receiving a first indication sent by a first device, the second device may further send a message including first capability information to the first device, where the first capability information indicates an error detection and correction mode supported by the second device. Before encoding the data by using the first mode, the second device may further determine, based on the mode selection condition, whether the first mode is allowed to be used to encode the data, and send a message including a response to the first indication to the first device. The response to the first indication indicates to the second device is allowed to use the first mode to encode the data. The second device may further encode the data by using the first mode when determining that the first mode is allowed to be used to encode the data. The second device may further receive a message that is sent by the first device and that includes the first indication. The second device may further receive a message that is sent by the first device and that includes the second indication. The second device may send a message including the response to the first indication to the first device. The message includes: a capability field, a control field, and a check field. The capability field is used to carry the first capability information. The control field is used to carry the first indication, the response to the first indication, the second indication, or the response to the second indication. The check field is used to carry the first check information.

Optionally, the message includes: a TSB message.

Optionally, the first status parameter includes: a pre-correction bit error rate.

Optionally, the error detection and correction mode includes an FEC mode.

According to a third aspect, a data processing apparatus, used in a first device, is provided. The apparatus includes modules configured to perform any data processing method provided in the first aspect.

According to a fourth aspect, another data processing apparatus, used in a second device, is provided. The apparatus includes modules configured to perform any data processing method provided in the second aspect.

According to a fifth aspect, still another data processing apparatus is provided. The data processing apparatus includes: a processor and a memory. The processor is configured to execute a program stored in the memory, to implement any data processing method provided in the first aspect.

According to a sixth aspect, yet another data processing apparatus is provided. The data processing apparatus includes a processor and a memory. The processor is configured to execute a program stored in the memory, to implement any data processing method provided in the second aspect.

According to a seventh aspect, a data transmission system is provided. The data transmission system includes: a first device and a second device. The first device is the data processing apparatus provided in the third aspect or the data processing apparatus provided in the fifth aspect. The second device is the data processing apparatus provided in the fourth aspect or the data processing apparatus provided in the sixth aspect.

According to an eighth aspect, a computer-readable storage medium is provided. The computer-readable storage medium stores instructions, and when the instructions are run on a computer, the computer is enabled to perform any data processing method provided in the first aspect or any data processing method provided in the second aspect.

According to a ninth aspect, a computer program product including instructions is provided. When the computer program product is run on a computer, the computer is enabled to perform any data processing method provided in the first aspect or any data processing method provided in the second aspect.

DETAILED DESCRIPTION OF ILLUSTRATIVE EMBODIMENTS

To make the objectives, technical solutions, and advantages of this application clearer, the following further describes in detail the implementations of this application with reference to the accompanying drawings.

Data transmission is a process of transferring data from one place to another. A data transmission system may generally include a data link for transmitting data and devices at both ends of the data link, where a device at one end of the data link is a transmitting end of the data, and a device at the other end is a receiving end of the data. In some cases, devices at both ends of the data link may be a transmitting end and a receiving end of each other. In other words, a device at one end may be a transmitting end or a receiving end, and a device at the other end may be a transmitting end or a receiving end.

Figure 1:
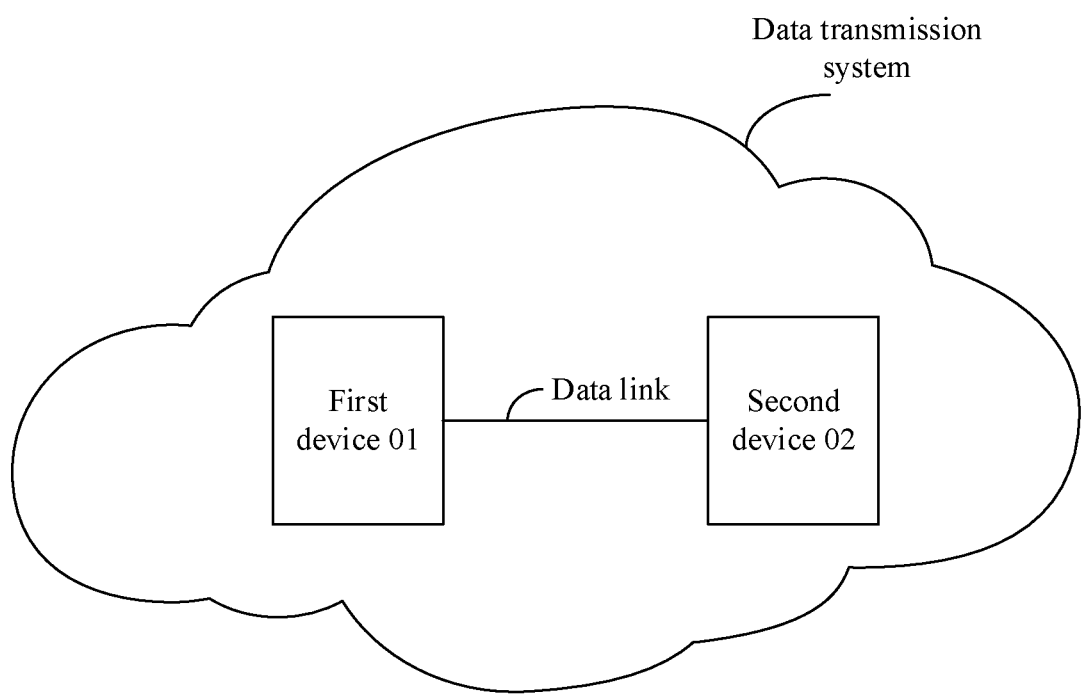
FIG. 1 is a schematic diagram of a structure of a data transmission system according to an embodiment of this application.

For example, FIG. 1 is a schematic diagram of a structure of a data transmission system according to an embodiment of this application. As shown in FIG. 1, the data transmission system may include a first device 01 and a second device 02, and a data link exists between the first device 01 and the second device 02. When the first device 01 sends data to the second device 02, the first device 01 is a transmitting end, and the second device 02 is a receiving end. When the second device 02 sends data to the first device 01, the second device 02 is a transmitting end, and the first device 01 is a receiving end.

However, in a data transmission process, because the data link may be interfered by an external factor, a bit error occurs in data transmitted on the data link. For example, a data signal sent by the transmitting end is "0", but the data signal received by the receiving end is "1", which indicates that a bit error exists in the transmitted data.

In a related technology, an error correction code may be introduced when the transmitting end encodes the data. Correspondingly, the receiving end performs decoding by using a corresponding error correction technology, thereby reducing a bit error rate of the data can be implemented. Currently, an FEC mode is a widely used error correction technology. The transmitting end may use the FEC mode to increase redundant information of the data when encoding the data, so that the receiving end can use the redundant information to recover bit-error data after the bit error occurs in the data transmission. In this way, the effect of reducing the bit error rate of the data is implemented. It may be understood that the FEC mode may provide gain for data received by the receiving end, so that a bit error rate of decoded data is reduced.

For example, when the FEC mode is applied in the data transmission system, the transmitting end may add a forward error correction code when encoding to-be-transmitted data, and then send encoded data to the receiving end. The receiving end decodes the received encoded data based on the FEC mode, to obtain data to be sent by the transmitting end. In a decoding process, the forward error correction code may be used to correct the bit-error data, to reduce a bit error rate of the decoded data.

However, the current application solution of the FEC mode has many problems.

In an application solution of the FEC mode, in the specification of the peripheral component interconnect express (PCIE) 6.0, it is specified that a fixed FEC mode is used when a data transmission rate is 64 giga transactions per second (GT/s) and above. However, the gain of this FEC mode is fixed and cannot be adjusted, and flexibility is poor.

In another FEC mode application solution, there are two FEC modes: an interleaved FEC mode and a non-interleaved FEC mode. The transmitting end device and the receiving end device carry a request for selecting the interleaved FEC mode and the non-interleaved FEC mode in the transmission training data stream, to negotiate FEC mode selection. However, in this solution, the transmitting end device and the receiving end device need to support both the interleaved FEC mode and the non-interleaved FEC mode. Otherwise, negotiation between the transmitting end device and the receiving end device fails, and consequently, the FEC mode cannot be used for the data transmission. In addition, in this solution, the FEC mode cannot be changed after the transmitting end device and the receiving end device negotiate with each other, and flexibility is relatively poor.

Figure 2A:
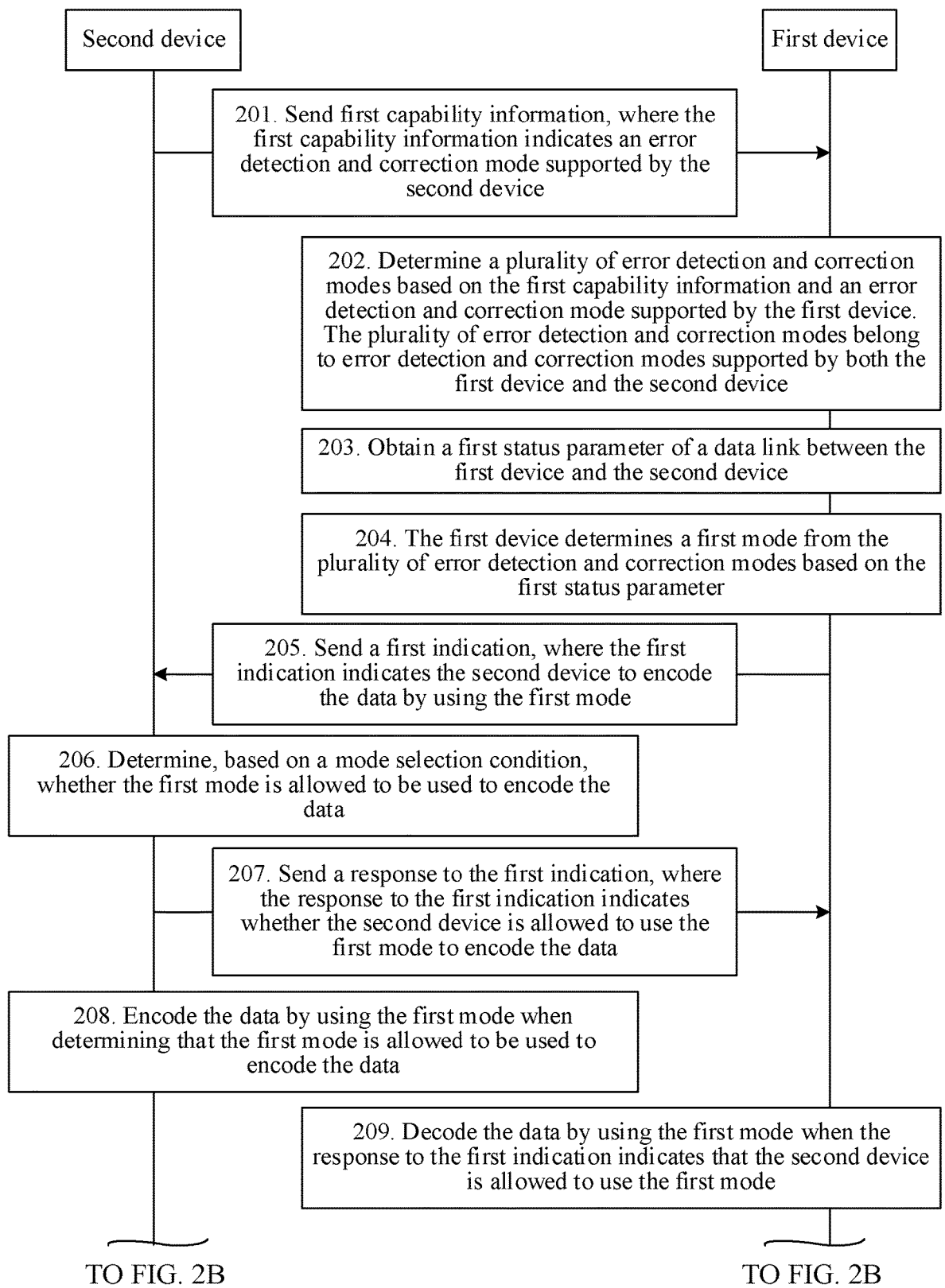
FIG. 2A and FIG. 2B are a flowchart of a data processing method according to an embodiment of this application.
Figure 2B:
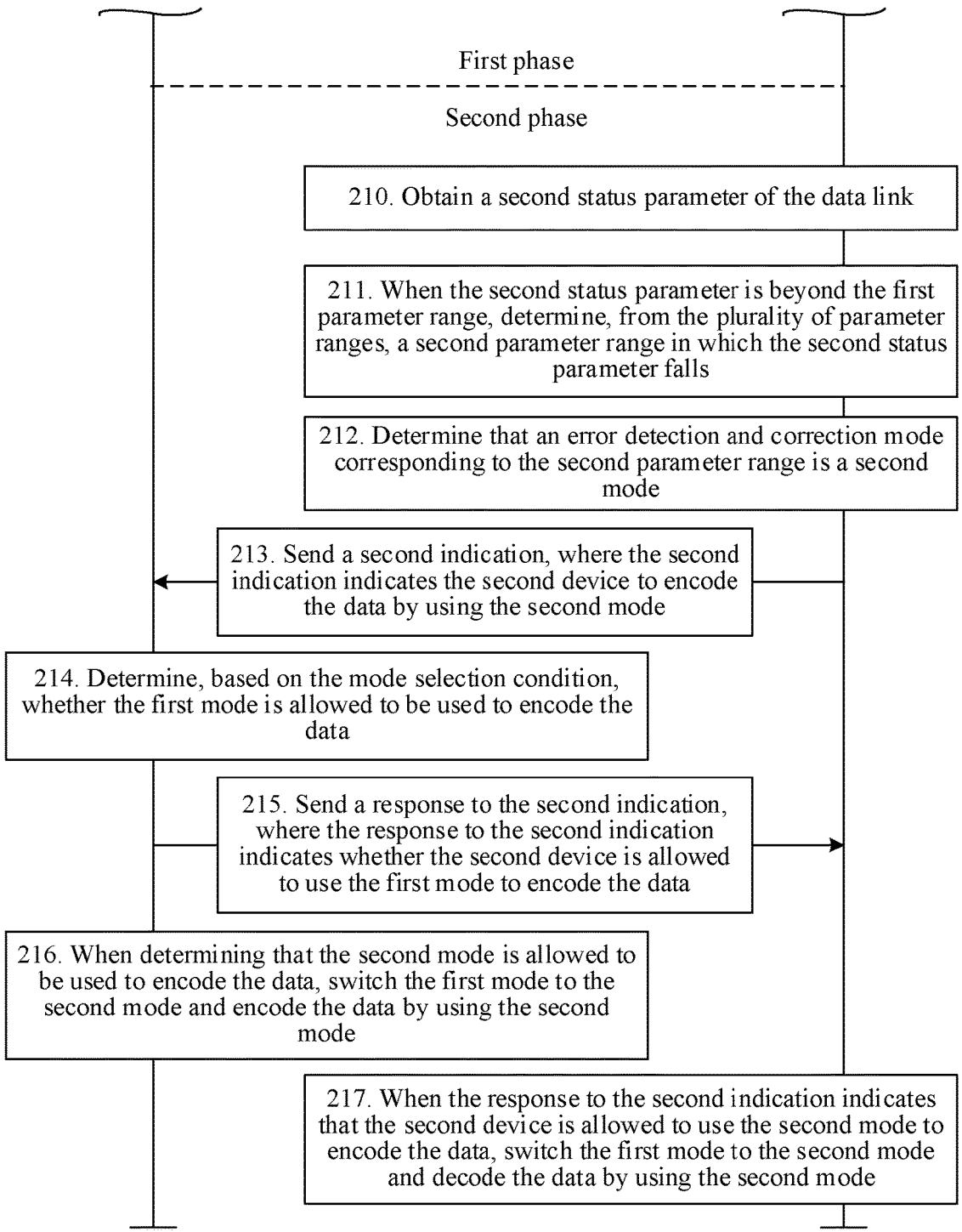

An embodiment of this application provides a data processing method, to resolve the foregoing problem in a related technology. FIG. 2A and FIG. 2B are a flowchart of a data processing method according to an embodiment of this application. The method may be applied to a data transmission system (the data transmission system shown in FIG. 1) provided in an embodiment of this application. As shown in FIG. 2A and FIG. 2B, the method may include the following steps.

Step 201: A second device sends first capability information to a first device, where the first capability information indicates an error detection and correction mode supported by the second device.

The error detection and correction technology can detect and correct bit errors generated during the data transmission, achieving the effect of reducing the bit error rate. However, the introduction of error detection and correction technology in the data transmission system reduces the bit error rate, but also increases overhead of the data transmission system. Therefore, different error detection and correction modes may be configured for the first device and the second device based on different bit error rates of a data link between the first device and the second device. Different error detection and correction modes have different error correction capabilities, and the error detection and correction modes with different error correction capabilities are applied to data links with different bit error rates. Therefore, when a bit error rate of the data link is relatively low, a waste of error correction performance is caused by applying an error detection and correction mode with a strong error correction capability, and unnecessary delay and power consumption can be avoided. Alternatively, the following case may be avoided: An error detection and correction mode with a relatively weak error correction capability is applied when a bit error rate of the data link is relatively high. Gain of the error detection and correction mode is insufficient, thereby increasing the bit error rate of the data link and reducing service transmission efficiency.

It should be noted that, in this embodiment of this application, both the first device and the second device may be configured to support a plurality of error detection and correction modes. The plurality of error detection and correction modes have different error detection and correction capabilities, so that different error detection and correction modes may be selected based on requirements of different error correction capabilities.

The second device may send the first capability information to the first device through the data link. The first capability information may indicate the error detection and correction mode supported by the second device.

Step 202: The first device determines a plurality of error detection and correction modes based on the first capability information and an error detection and correction mode supported by the first device. The plurality of error detection and correction modes belong to error detection and correction modes supported by both the first device and the second device.

For example, the error detection and correction mode supported by the first device may include a mode 1, a mode 2, and a mode 3, and the error detection and correction mode supported by the second device may include a mode 0, a mode 1, a mode 2, and a mode 3. The first device may determine, based on an indication of the first capability information, the error detection and correction mode supported by the second device, and determine, with reference to the error detection and correction mode supported by the first device, that the plurality of error detection and correction modes supported by both the first device and the second device are the mode 1, the mode 2, and the mode 3.

Step 203: The first device obtains a first status parameter of a data link between the first device and the second device.

The second device may send a message including first check information to the first device. After receiving the message, the first device may perform check based on the first check information, and may obtain the first status parameter based on a check result.

The first status parameter is a parameter that reflects a status of the data link between the first device and the second device. For example, the first status parameter may include a pre-correction bit error rate. The pre-correction bit error rate is a bit error rate used before error correction is performed on data received by a receiving end. The first check information may be obtained by performing data check. A check manner may be a cyclic redundancy check (CRC), a parity check, or the like.

Step 204: The first device determines a first mode from the plurality of error detection and correction modes based on the first status parameter.

A plurality of parameter ranges may be configured in the first device, and a correspondence between a parameter range and an error detection and correction mode may be configured. The plurality of error detection and correction modes may be in a one-to-one correspondence with the plurality of parameter ranges. The first device may determine, from the plurality of parameter ranges, a first parameter range within which the first status parameter falls, and may further determine that an error detection and correction mode corresponding to the first parameter range is the first mode.

For example, different error detection and correction modes may be classified based on different pre-correction bit error rate ranges, and a plurality of error detection and correction modes may be in a one-to-one correspondence with a plurality of pre-correction bit error rate ranges. Therefore, as a receiving end of the data, the first device may select, based on a range within which the obtained value of the pre-correction bit error rate falls, an error detection and correction mode used for decoding.

Step 205: The first device sends a first indication to the second device, where the first indication indicates to the second device to encode the data by using the first mode.

It can be learned that when the first device is used as the receiving end of the data, the second device is the transmitting end of the data. The receiving end sends the first indication to the transmitting end, to indicate the transmitting end (the second device) to perform encoding based on the error detection and correction mode (that is, the first mode) selected by the receiving end during decoding, to ensure that encoding and decoding modes are the same.

It should be noted that the first indication may directly indicate the second device to use the first mode to encode the data. For example, content of the first indication is that the encoding mode is the first mode. Certainly, the first indication may not directly indicate the second device to encode the data by using a first mode that needs to be used by the second device during encoding. Content of the first indication may be that the decoding mode is the first mode. Further, after learning that the error detection and correction mode selected by the first device during decoding is the first mode, the second device needs to select a same first mode for encoding, thereby implementing indirect indication.

Step 206: The second device determines, based on a mode selection condition, whether the first mode is allowed to be used to encode the data.

There are many factors that affect a bit error rate of the data link. The second device needs to select, with reference to an actual situation of the data link, an error detection and correction mode used during data encoding. The second device can be configured with the mode selection condition. The mode selection condition may include a selection condition based on a length of a data link, a bandwidth, a data transmission rate, and/or a temperature of the device. This is not limited in this embodiment of this application.

For example, the mode selection condition includes: When the data transmission rate is higher than 64 GT/s, error detection and correction modes 2 and 3 are allowed; or when the data transmission rate is lower than 64 GT/s, error detection and correction modes 0 and 1 are allowed. It is assumed that the first mode is the error detection and correction mode 0. If the current data transmission rate is higher than 64 GT/s, the second device is not allowed to encode the data by using the first mode. If the current data transmission rate is 64 GT/s or lower, the second device is allowed to encode the data by using the first mode.

After receiving the first indication sent by the first device, the second device needs to determine, based on the mode selection condition, whether the second device is allowed to encode the data by using the first mode.

Step 207: The second device sends a response to the first indication to the first device, where the response to the first indication indicates whether the second device is allowed to use the first mode to encode the data.

After performing determining based on the mode selection condition, the second device may send the response to the first indication to the first device, where the response is a result of the determining performed by the second device.

For example, if the second device allows encoding the data by using the first mode, the response to the first indication may be an "allow" response. If the second device does not allow encoding the data by using the first mode, the response to the first indication may be a "reject" response.

Step 208: The second device encodes the data by using the first mode when determining that the first mode is allowed to be used to encode the data.

As the transmitting end of the data, the second device may encode the data by using the first mode before sending the data, and then send encoded data to the first device.

Step 209: The first device decodes the data by using the first mode when the response to the first indication indicates that the second device is allowed to use the first mode.

As the receiving end, the first device may determine, based on the response to the second indication, that the second device allows using the first mode to perform encoding, and then may decode the received data by using the first mode, thereby ensuring that the decoding mode matches the encoding mode.

It should be noted that step 201 to step 209 are a first phase of the data processing method provided in this embodiment of this application. In the first phase, service data transmission is not performed between the first device and the second device, and the first device and the second device determine the first mode through negotiation. After the first phase, a second phase of the data processing method provided in this embodiment of this application starts to transmit the service data. Therefore, the first device and the second device start to work by using the first mode, and it is ensured that the encoding mode of the transmitting end of the service data is consistent with the decoding mode of the receiving end. Optionally, the first device and the second device provided in this embodiment of this application may be devices using the PCIE technology, and the first phase may be a link training phase of the first device and the second device.

Step 210: The first device obtains a second status parameter of the data link.

After determining to use the first mode in the first phase, the first device and the second device enter the second phase to start service data transmission. The first device may obtain a second status parameter of the data link in a process of the service data transmission. For the second status parameter, refer to the foregoing first status parameter. Details are not described herein in this embodiment of this application.

In the process of the service data transmission, interference to the data link may change, or temperature of a device and a line for transmitting data may change, which may cause a status parameter of the data link to change, making a currently used error detection and correction mode (that is, the first mode) does not match a range of a current status parameter. If the error detection and correction mode does not match the range of the current status parameter, the bit error rate of the transmitted data may increase, or the error correction performance may be excessive.

For example, that the second status parameter is a pre-correction bit error rate is used as an example. If a pre-correction bit error rate currently obtained by the first device is greater than the maximum value of the pre-correction bit error rate range corresponding to the first mode, then when the first device decodes the received data by using the first mode, a gain provided by the first device is insufficient, and a bit error rate of the decoded data increases. If the pre-correction bit error rate currently obtained by the first device is less than a minimum value of the range of the pre-correction bit error rate corresponding to the first mode, performing encoding and decoding by using the first mode causes excessive error correction performance and unnecessary overheads.

Therefore, in the process of the service data transmission, the second status parameter of the data link needs to be obtained, to monitor whether a currently used error detection and correction mode is appropriate.

Optionally, in the process of the service data transmission, the first device may receive encoded data that is sent by the second device and that is obtained by encoding the data by using the first mode, where the encoded data may carry second check information. The first device may decode the encoded data by using the first mode, and obtain the second status parameter based on the second check information carried in the encoded data.

In an optional implementation, when sending the encoded data obtained by encoding the data by using the first mode to the first device, the second device may periodically insert an alignment marker (AM) into a data stream, and carry the second check information in the AM. After receiving the AM, the first device may perform check based on the second check information, and take statistics of the pre-correction bit error rate of the current data link based on the second check information.

Figure 3:
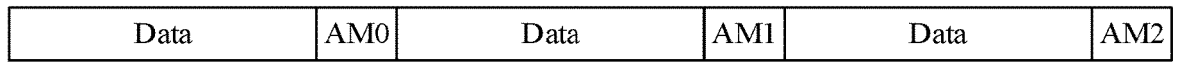
FIG. 3 is a schematic diagram of a structure of a data stream according to an embodiment of this application.

For example, the to-be-transmitted data may be split into a plurality of data blocks, and an AM is added after each data block, where the AM carries check information of the data block. FIG. 3 is a schematic diagram of a structure of a data stream. As shown in FIG. 3, an AM0, an AM1, and an AM2 may all carry check information of a data block before the AM0, the AM1, and the AM2.

Figure 4:
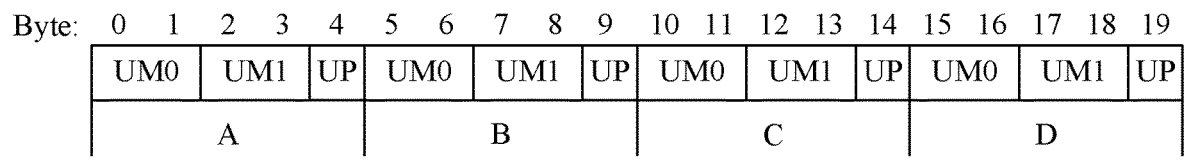
FIG. 4 is a schematic diagram of a format of an AM field according to an embodiment of this application.

For another example, FIG. 4 is a schematic diagram of a format of an AM field. As shown in FIG. 4, the AM field may include 20 bytes, and may be divided into 4 sub-fields in a unit of 5 bytes (4 sub-fields A, B, C, and D as shown in FIG. 3). Formats of the 4 sub-fields may be the same. Each sub-field may include a unique marker (UM) field and a unique programming (UP) field. The UM field may include UM0 and UM1. UM0 and UM1 occupy 2 bytes, and the UP field occupies one byte.

The encoding structure of the AM field may include the following two aspects.

In one aspect, the UM0 field and the UM1 field in the AM field may be encoded by using an error detection and correction code (for example, a BCH code), and a bit error case of the AM field may be collected by using an error detection capability of the error detection and correction code.

On the other hand, the UP field in the AM field stores check information. Because the AM field is interspersed in the transmitted data, the check information is generated by performing check (for example, CRC) on data between two adjacent AM fields. It should be noted that check information generated after a piece of data is checked may be inserted into a UP field in an AM field located after the piece of data (including the UP field in each sub-field). The receiving end may check the check information carried in the UP field in the AM field, to detect the pre-correction bit error rate.

Step 211: When the second status parameter is beyond the first parameter range, the first device determines, from the plurality of parameter ranges, a second parameter range within which the second status parameter falls.

When the first device detects that the second status parameter is beyond the first parameter range, it indicates that the second status parameter does not match the currently used first mode. The first device needs to determine the second parameter range within which the second status parameter falls.

When the first device detects that the second status parameter is within the first parameter range, it indicates that the second status parameter matches the currently used first mode, and the first mode may continue to be used for error detection and correction.

Step 212: The first device determines that an error detection and correction mode corresponding to the second parameter range is a second mode.

The first device determines the error detection and correction mode corresponding to the second parameter range within which the second status parameter falls as the second mode.

Step 213: The first device sends a second indication to the second device, where the second indication indicates to the second device to encode the data by using the second mode.

Because the currently used first mode is no longer suitable for the current link status, the first device sends the second indication to indicate the second device to perform encoding by using an error detection and correction mode (that is, the second mode) that matches the current link status.

Step 214: The second device determines, based on a mode selection condition, whether the second mode is allowed to use the second mode to encode the data.

For content of step 214, refer to related descriptions of step 206. Details are not described herein again.

Step 215: The second device sends a response to the second indication to the first device, where the response to the second indication indicates whether the second device is allowed to use the second mode to encode the data.

After performing determining based on the mode selection condition, the second device may send the response to the second indication to the first device, where the response is a result of the determining performed by the second device. For content of step 215, refer to related descriptions of step 207. Details are not described herein again.

Step 216: When determining that the second mode is allowed to be used to encode the data, the second device switches the first mode to the second mode and encodes the data by using the second mode.

When determining that the second mode is allowed to be used for encoding the data, the second device may switch the error detection and correction mode currently used for encoding the data from the first mode to the second mode, to match the status of the current data link. Then, the second mode may be used to encode the data, and the encoded data is sent to the first device.

Step 217: When the response to the second indication indicates that the second device is allowed to use the second mode to encode the data, the first device switches the first mode to the second mode and decodes the data by using the second mode.

If the first device determines, based on the response to the second indication, that the second device allows encoding the data by using the second mode, the first device decodes the received data by using the second mode, to ensure that the decoding mode matches the encoding mode.

It should be noted that, in a process of performing service data transmission in the second phase, if the first device detects that the current link status parameter does not match the first mode (that is, when step 211 is performed), the service data transmission needs to be suspended. Then, the first device and the second device need to negotiate and determine a new error detection and correction mode (that is, the second mode) to continue the service data transmission (that is, after step 217). A phase in which the first device and the second device negotiate and determine the new error detection and correction mode is similar to the first phase. If the first device and the second device are devices using the PCIE technology, this phase may be referred to as a retrain phase of the data link.

In conclusion, an embodiment of this application provides a data processing method. The first device may determine, based on first capability information sent by the second device, error detection and correction modes supported by both parties. A correspondence between the error detection and correction mode and the first status parameter of the data link is further configured in the first device. In this way, the first device can determine the first mode based on the obtained first status parameter of the data link. Then, the first device may indicate the second device to perform encoding by using the first mode, and the first device performs decoding by using the first mode, thereby implementing error detection and correction of transmitted data. In the method provided in this embodiment of this application, the first device and the second device may support a plurality of error detection and correction modes, and may determine a used error detection and correction mode based on the status parameter of the data link, so that application of the error detection and correction technology is more flexible.

In addition, after the data transmission is performed by using the first mode, the first device may further detect the second status parameter of the data link in the process of the data transmission, and switch the first mode to the second mode when the second status parameter does not match the first mode. In the process of the data transmission, an error detection and correction mode is switched based on the status of the current data link, which is more flexible, and helps improve performance of the data transmission system.

It should be noted that, in step 203, if the first status parameter is not within the parameter ranges corresponding to the plurality of error detection and correction modes, the first device cannot determine the first mode from the plurality of error detection and correction modes. In this case, the first device may determine the bypass mode, indicating that the first device chooses not to use the error detection and correction mode.

For example, the first status parameter is the pre-correction bit error rate. If the pre-correction bit error rate obtained by the first device is very small, the pre-correction bit error rate does not belong to a parameter range corresponding to any error detection and correction mode, the first device may determine the bypass mode. It should be noted that, in this case, because the pre-correction bit error rate is very small, the error detection and correction technology does not need to be used during the data transmission.

It should be further noted that, if the first device determines the bypass mode in step 204, the first indication correspondingly indicates that the second device uses the bypass mode for encoding. If the second device allows encoding by using the bypass mode, the second device does not use the error detection and correction mode for encoding, and the first device does not use the error detection and correction mode for decoding.

In addition, when the second status parameter obtained in step 211 is not within the parameter ranges corresponding to the plurality of error detection and correction modes, the first device may also determine the bypass mode in step 212. Therefore, the second indication correspondingly indicates to the second device to switch the first mode to the bypass mode. If the second device allows encoding by using the bypass mode, the second device does not perform encoding by using the error detection and correction mode subsequently, and the first device does not perform decoding by using the error detection and correction mode.

It should be understood that, in the foregoing embodiment of this application, that the first device is the receiving end and the second device is the transmitting end is used as an example. Certainly, the first device may also serve as the transmitting end, and the second device may also serve as the receiving end. Therefore, the first device may alternatively perform the method performed by the second device in the foregoing embodiment, and the second device may alternatively perform the method performed by the first device in the foregoing embodiment. This is not limited in this embodiment of this application.

It should be further understood that, if both the first device and the second device may serve as both the transmitting end and the receiving end, when data is transmitted between the first device and the second device in different directions, bit error rates of the data received by the receiving end may be different. Correspondingly, when data is transmitted in two different directions, different error detection and correction modes may be used. Using the first device as an example, the error detection and correction mode used by the first device to encode the data before sending the data may be different from the error detection and correction mode used by the first device to decode the received data. In addition, a process in which the first device and the second device negotiate an error detection and correction mode used for transmitting data is independent of a process in which the first device and the second device negotiate an error detection and correction mode used for receiving data. The gain provided by the error detection and correction technology for the transmitted data can be adjusted independently in two data transmission directions.

It should be further noted that the first capability information, the first indication, the response to the first indication, the second indication, and the response to the second indication that are transmitted between the first device and the second device in the foregoing embodiment may also be carried in messages for transmission. In addition, formats of the messages used to carry the first check information, the first capability information, the first indication, the response to the first indication, the second indication, and the response to the second indication may be the same. In other words, these messages may all include fields used to carry the first check information, the capability information, the indication, and the response to the indication. When the device transmits the first check information, the capability information, the indication, or the response to the indication, only a corresponding field in the message needs to carry valid information.

For example, the message may include: a capability field, a control field, and a check field. The capability field may be used to carry the first capability information. The control field may be used to carry the first indication, the response to the first indication, the second indication, or the response to the second indication. The check field may be used to carry the first check information. In an implementation, the check field may be located after the capability field and the control field, and the first check information carried by the check field may be obtained by checking the capability field and the control field. In addition, when the first phase of steps 201 to 209 is the link training phase, the message may be a training set block message transmitted in the link training phase.

For example, the error detection and correction mode is an FEC mode, and the message is a TSB message. For example, the TSB message may include an FEC capability (CAP) field (that is, the foregoing capability field), and the FEC capability field may be used to carry the first capability information, to indicate an FEC mode (including the encoding mode and the decoding mode) supported by the first device. Table 1 is an explanation description of a format of an FEC CAP field provided in this application.

TABLE 1

| FEC CAP | Bit 0: FEC Mode 0 Coder support |
|---|---|
| | Bit 1: FEC Mode 1 Coder support |
| | Bit 2: FEC Mode 2 Coder support |
| | Bit 3: FEC Mode 3 Coder support |
| | Bit 4: FEC Mode 0 Encoder support |
| | Bit 5: FEC Mode 1 Encoder support |
| | Bit 6: FEC Mode 2 Encoder support |
| | Bit 7: FEC Mode 3 Encoder support |

As shown in Table 1, the first 4 bits of the FEC capability field may indicate the encoding mode supported by the second device. For example, the 1st bit (Bit 0) indicates whether the second device supports an FEC mode 0 for encoding. In Table 1, an example in which the Bit 0 indicates that the second device supports the FEC mode 0 for encoding (FEC Mode 0 Coder support) is used. The 2nd bit (Bit 1) indicates whether the second device supports an FEC mode 1 for encoding (FEC Mode 1 Coder support). In Table 1, an example in which the Bit 1 indicates that the second device supports the FEC mode 1 for encoding (FEC Mode 1 Coder support) is used. The 3rd bit (Bit 2) indicates whether the second device supports an FEC mode 2 for encoding (FEC Mode 2 Coder support). In Table 1, an example in which the Bit 2 indicates that the second device supports the FEC mode 2 for encoding (FEC Mode 2 Coder support) is used. The 4th bit (Bit 3) indicates whether the second device supports an FEC mode 3 for encoding (FEC Mode 3 Coder support). In Table 1, an example in which the Bit 3 indicates that the second device supports the FEC mode 3 for encoding (FEC Mode 3 Coder support) is used.

Optionally, because the second device may serve as both the transmitting end and the receiving end, the second device may also carry decoding capability information of the second device to the sent first capability information.

Still referring to Table 1, the last 4 bits of the FEC capability field may indicate a decoding mode supported by the second device. For example, the 5th bit (Bit 4) indicates whether the second device supports the FEC mode 0 for decoding (FEC Mode 0 Encoder support). In Table 1, an example in which the Bit 4 indicates that the second device supports the FEC mode 0 for decoding (FEC Mode 0 Encoder support) is used. The 6th bit (Bit 5) indicates whether the second device supports the FEC mode 1 for decoding (FEC Mode 1 Encoder support). In Table 1, an example in which the Bit 5 indicates that the second device supports the FEC mode 1 for decoding (FEC Mode 1 Encoder support) is used. The 7th bit (Bit 6) indicates whether the second device supports the FEC mode 2 for decoding (FEC Mode 2 Encoder support). In Table 1, an example in which the Bit 6 indicates that the second device supports the FEC mode 2 for decoding (FEC Mode 2 Encoder support) is used. The 8th bit (Bit 7) indicates whether the second device supports the FEC mode 3 for decoding (FEC Mode 3 Encoder support). In Table 1, an example in which the Bit 7 indicates that the second device supports the FEC mode 3 for decoding (FEC Mode 3 Encoder support) is used.

For another example, that the error detection and correction mode is the FEC mode is still used as an example, and the TSB message may further include an FEC mode control field (that is, the foregoing control field). The FEC mode control field may be used to carry an indication (for example, the first indication or the second indication) and a response to the indication (for example, the response to the first indication or the response to the second indication). Table 2 is an explanation of the FEC mode control field. As shown in Table 2, the FEC mode control field may include eight bits, and the first three bits may indicate an indication sent by the first device, and indicate a mode that the first device expects the second device to use. The fourth bit may indicate a response sent by the second device to the indication, and indicate whether the second device allows using a mode indicated by the first indication or the second indication. The 5th to 8th bits may be reserved bits, and do not indicate any information.

TABLE 2

| FEC Mode Control | Bit [2:0] | 3'b000: coder Bypass |
| --- | --- | --- |
| | | 3'b001: FEC coder Mode 0 |
| | | 3'b010: FEC coder Mode 1 |
| | | 3'b011: FEC coder Mode 2 |
| | | 3'b100: FEC coder Mode 3 |
| | | 3'b101-3'b111: Reserved |
| | Bit [3] | FEC mode control Reject |
| | Bit [7:4] | Reserved |

Further referring to Table 2, when the first 3 bits have different values, different indications may be represented. For example, the binary number "000" indicates that the mode selected by the first device is the bypass mode (Encoder Bypass), that is, the FEC mode is not used for encoding. For another example, "001" indicates that the mode that the first device expects the second device to use is an FEC encoding mode 0 (FEC coder Mode 0). "010" indicates that the mode that the first device expects the second device to use is an FEC encoding mode 1 (FEC coder Mode 1). "011" indicates that the mode that the first device expects the second device to use is the FEC encoding mode 2 (FEC coder Mode 2). "100" indicates that the mode that the first device expects the second device to use is an FEC encoding mode 3 (FEC coder Mode 3). Binary numbers "101" to "111" are reserved bits. If the first device further supports more modes, "101" to "111" may be used to represent more modes. For example, "101" indicates that the mode that the first device expects the second device to use is an FEC encoding mode 4. This is not limited in this embodiment of this application. A response to the indication indicated by the 4th bit in Table 2 is: rejecting FEC mode control (FEC mode control Reject), that is, indicating that the second device is not allowed to use the mode indicated by the first device. The 5th to 8th bits in Table 2 are currently reserved bits.

It should be noted that in Table 2, 3 bits are used to represent the indication sent by the first device. Certainly, in the FEC mode control field, 4 or 5 bits may also be used to represent the indication sent by the first device. For example, when the first device can select a relatively large quantity of FEC modes, 3 bits cannot represent all the FEC modes. In this case, the first 4 or 5 bits may be used to represent the indication sent by the first device. Correspondingly, the 5th or 6th bit is used to represent the response sent by the second device to the indication. Adjustment may be performed based on an actual situation. This is not limited in this embodiment of this application.

It should be further noted that the FEC capability field and the FEC mode control field are located in different bits in the TSB message. For example, the FEC capability field is located in the first 8 bits of the TSB message, and the FEC mode control field is located in the 9th to 16th bits. Certainly, a sequence of the FEC capability field and the FEC mode control field may also be exchanged. This is not limited in this embodiment of this application.

For another example, the 17th bit and the 18th bit in the TSB message may be the foregoing check fields, which are used to carry check information for the FEC capability field and the FEC mode control field. In an implementation, the 17th bit may be used to carry check information for the first 8 bits of the TSB message, and the 18th bit may be used to carry check information for the 9th to 16th bits of the TSB message. Certainly, the check information may also be carried in another manner. This is not limited in this embodiment of this application. The check information carried in the check field is the first check information described above.

Figure 5:
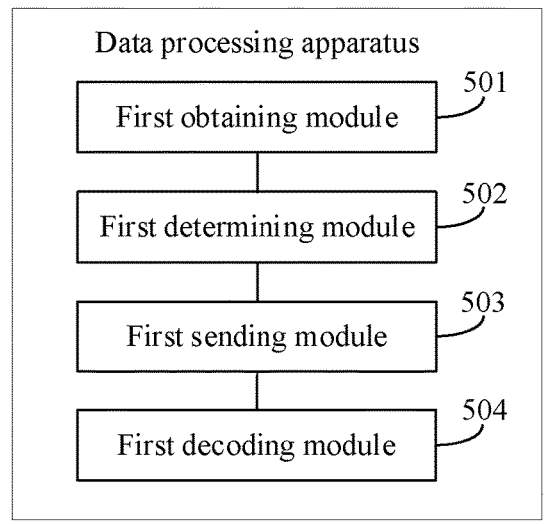
FIG. 5 is a schematic diagram of a structure of a data processing apparatus according to an embodiment of this application.

FIG. 5 is a schematic diagram of a structure of a data processing apparatus 50 according to an embodiment of this application. The data processing apparatus 50 may be used in a first device. As shown in FIG. 5, the data processing apparatus 50 may include: a first obtaining module 501, a first determining module 502, a first sending module 503, and a first decoding module 504.

The first obtaining module 501 is configured to obtain a first status parameter of a data link between the first device and a second device.

The first determining module 502 is configured to determine a first mode from a plurality of error detection and correction modes based on the first status parameter.

The first sending module 503 is configured to send a first indication to the second device, where the first indication indicates to the second device to encode the data by using the first mode.

The first decoding module 504 is configured to decode the data by using the first mode.

Optionally, the plurality of error detection and correction modes are in a one-to-one correspondence with a plurality of parameter ranges. The first determining module 502 is configured to determine, from the plurality of parameter ranges, a first parameter range within which the first status parameter falls, and further determine that an error detection and correction mode corresponding to the first parameter range is the first mode.

Optionally, the data processing apparatus 50 may further include a second obtaining module, a second determining module, a third determining module, a second sending module, a switching module, and a second decoding module.

The second obtaining module (not shown in FIG. 5) is configured to obtain a second status parameter of the data link after the first mode is used to decode the data.

The second determining module (not shown in FIG. 5) is configured to: when the second status parameter is beyond the first parameter range, determine, from the plurality of parameter ranges, a second parameter range within which the second status parameter falls.

The third determining module (not shown in FIG. 5) is configured to determine that an error detection and correction mode corresponding to the second parameter range is a second mode.

The second sending module (not shown in FIG. 5) is configured to send a second indication to the second device, where the second indication indicates to the second device to encode the data by using the second mode.

The switching module (not shown in FIG. 5) is configured to switch the first mode to the second mode.

The second decoding module (not shown in FIG. 5) is configured to decode data by using the second mode.

Optionally, the data processing apparatus 5o may further include a first receiving module and a switching module.

The first receiving module (not shown in FIG. 5) is configured to: before the decoding the data by using the second mode, receive a response sent by the second device to the second indication, where the response to the second indication indicates whether the second device is allowed to use the second mode to encode the data.

The switching module (not shown in FIG. 5) is configured to switch the first mode to the second mode when the response to the second indication indicates that the second device is allowed to use the second mode.

Optionally, the data processing apparatus 5o may further include a second receiving module and a fourth determining module.

The second receiving module (not shown in FIG. 5) is configured to: before the determining a first mode from the plurality of error detection and correction modes based on the first status parameter, receive first capability information sent by the second device, where the first capability information indicates an error detection and correction mode supported by the second device.

The fourth determining module (not shown in FIG. 5) is configured to determine the plurality of error detection and correction modes based on the first capability information and an error detection and correction mode supported by the first device. The plurality of error detection and correction modes belong to error detection and correction modes supported by both the first device and the second device.

Optionally, the data processing apparatus 50 may further include a third receiving module and the first decoding module 504.

The third receiving module (not shown in FIG. 5) is configured to: before the decoding data by using the first mode, receive a response sent by the second device to the first indication, where the response to the first indication indicates whether the second device is allowed to use the first mode to encode the data.

The first decoding module 504 is configured to decode the data by using the first mode when the response to the first indication indicates that the second device is allowed to use the first mode.

Optionally, the data processing apparatus 50 may further include a fourth receiving module and the first obtaining module 501.

The fourth receiving module (not shown in FIG. 5) is configured to: before the obtaining a first status parameter of a data link between the first device and a second device, receive a message that is sent by the second device and that includes first check information.

The first obtaining module 501 is configured to obtain the first status parameter based on the first check information.

Optionally, the data processing apparatus 50 may further include a fifth receiving module, the first decoding module 504, and a second obtaining module.

The fifth receiving module (not shown in FIG. 5) is configured to: before the decoding data by using the first mode, receive encoded data that is sent by the second device and that is obtained by encoding the data by using the first mode, where the encoded data carries second check information.

The first decoding module 504 is configured to decode the encoded data by using the first mode.

The second obtaining module (not shown in FIG. 5) is configured to obtain the second status parameter based on the second check information carried in the encoded data.

Optionally, the data processing apparatus 50 may further include a sixth receiving module, a seventh receiving module, an eighth receiving module, the first sending module 503, a second sending module, and a first receiving module.

The sixth receiving module (not shown in FIG. 5) is configured to: before the obtaining a first status parameter of a data link between the first device and a second device, receive a message that is sent by the second device and that includes first check information.

The seventh receiving module (not shown in FIG. 5) is configured to: before the determining a first mode from a plurality of error detection and correction modes based on the first status parameter, receive a message that is sent by the second device and that includes first capability information, where the first capability information indicates an error detection and correction mode supported by the second device.

The eighth receiving module (not shown in FIG. 5) is configured to: before the decoding data by using the first mode, receive a message that is sent by the second device and that includes a response to the first indication, where the response to the first indication indicates whether the second device is allowed to use the first mode to encode the data.

The first sending module 503 is configured to send a message including the first indication to the second device.

The second sending module (not shown in FIG. 5) is configured to send a message including the second indication to the second device.

The first receiving module (not shown in FIG. 5) is configured to receive a message that is sent by the second device and that includes the response to the second indication.

The message includes: a capability field, a control field, and a check field. The capability field is used to carry the first capability information. The control field is used to carry the first indication, the response to the first indication, the second indication, or the response to the second indication. The check field is used to carry the first check information.

Optionally, the message may include: a TSB message.

Optionally, the first status parameter includes: a pre-correction bit error rate.

Optionally, the error detection and correction mode includes an FEC mode.

It should be understood that actions performed by at least some of the plurality of modules mentioned above may be completed by a same module, and correspondingly, the at least some modules may be integrated into one module. For example, the first obtaining module and the second obtaining module may be integrated into one obtaining module. The first determining module, the second determining module, the third determining module, and the fourth determining module may be integrated into one determining module. The first sending module and the second sending module may be integrated into one sending module. The first decoding module and the second decoding module may be integrated into one decoding module. The first receiving module, the second receiving module, the third receiving module, the fourth receiving module, the fifth receiving module, the sixth receiving module, the seventh receiving module, and the eighth receiving module may be integrated into one receiving module. In addition, the plurality of determining modules mentioned above and the switching module may be integrated into one control module, which is configured to control selection of an error detection and correction mode. This is not limited in this application.

In conclusion, an embodiment of this application provides a data processing apparatus. When the data processing apparatus is used in a first device, the first device may determine, based on first capability information sent by the second device, error detection and correction modes supported by both parties. A correspondence between the error detection and correction mode and the first status parameter of the data link is further configured in the first device. In this way, the first device can determine the first mode based on the obtained first status parameter of the data link. Then, the first device may indicate the second device to perform encoding by using the first mode, and the first device performs decoding by using the first mode, thereby implementing error detection and correction of transmitted data. In the method provided in this embodiment of this application, the first device and the second device may support a plurality of error detection and correction modes, and may determine a used error detection and correction mode based on the status parameter of the data link, so that application of the error detection and correction technology is more flexible.

In addition, after the data transmission is performed by using the first mode, the first device may further detect the second status parameter of the data link in the process of the data transmission, and may indicate the second device to switch the first mode to the second mode when the second status parameter does not match the first mode. In the process of the data transmission, an error detection and correction mode is switched based on the status of the current data link, which is more flexible, and helps improve performance of the data transmission system.

Figure 6:
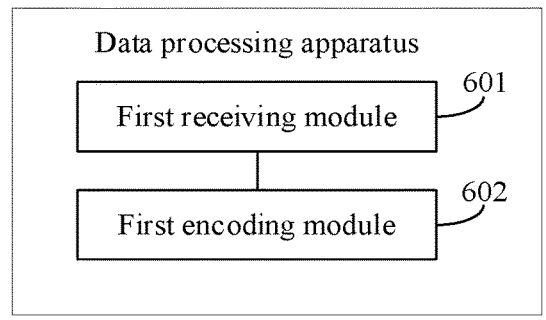
FIG. 6 is a schematic diagram of a structure of another data processing apparatus according to an embodiment of this application.

FIG. 6 is a schematic diagram of a structure of another data processing apparatus 60 according to an embodiment of this application. The data processing apparatus 60 may be used in a second device. As shown in FIG. 6, the data processing apparatus 60 may include a first receiving module 601 and a first encoding module 602.

The first receiving module 601 is configured to receive a first indication sent by a first device, where the first indication indicates a second device to encode data by using a first mode.

The first encoding module 602 is configured to encode the data by using the first mode based on the first indication.

Optionally, the data processing apparatus 60 may further include a second receiving module, a switching module, and a second encoding module.

The second receiving module is configured to: after the encoding the data by using the first mode, receive a second indication sent by the first device, where the second indication indicates to the second device to encode the data by using a second mode.

The switching module (not shown in FIG. 6) is configured to switch the first mode to the second mode.

The second encoding module (not shown in FIG. 6) is configured to encode the data by using the second mode.

Optionally, the data processing apparatus 60 may further include a first determining module, a first sending module, and a switching module.

The first determining module (not shown in FIG. 6) is configured to: before the encoding the data by using the second mode, determine, based on a mode selection condition, whether the second mode is allowed to be used to encode the data.

The first sending module (not shown in FIG. 6) is configured to send a response to the second indication to the first device, where the response to the second indication indicates whether the second device is allowed to use the second mode to encode the data.

The switching module (not shown in FIG. 6) is configured to switch the first mode to the second mode when it is determined that the second mode is allowed to be used to encode the data.

Optionally, the data processing apparatus 60 may further include a second sending module.

The second sending module (not shown in FIG. 6) is configured to: before the encoding the data by using the second mode, send first capability information to the first device, where the first capability information indicates an error detection and correction mode supported by the second device.

Optionally, the data processing apparatus 60 may further include a second determining module, a third sending module, and the first encoding module 602.

The second determining module (not shown in FIG. 6) is configured to: before the encoding the data by using the first mode, determine, based on the mode selection condition, whether the first mode is allowed to be used to encode the data.

The third sending module (not shown in FIG. 6) is configured to send a response to the first indication to the first device, where the response to the first indication indicates whether the second device is allowed to use the first mode to encode the data.

The first encoding module 602 is configured to encode the data by using the first mode when it is determined that the first mode is allowed to be used to encode the data.

Optionally, the data processing apparatus 60 may further include a fourth sending module.

The fourth sending module (not shown in FIG. 6) is configured to: before the receiving a first indication sent by the first device, send a message including first check information to the first device.

Optionally, the data processing apparatus 60 may further include a fifth sending module.

The fifth sending module (not shown in FIG. 6) is configured to: after the encoding the data by using the first mode, send encoded data that is obtained by encoding the data by using the first mode to the first device, where the encoded data carries second check information.

Optionally, the data processing apparatus 60 may further include a sixth sending module, a seventh sending module, the first receiving module 601, a second receiving module, and a third sending module.

The sixth sending module (not shown in FIG. 6) is configured to: before the receiving a first indication sent by a first device, send a message including first capability information to the first device, where the first capability information indicates an error detection and correction mode supported by the second device.

The seventh sending module (not shown in FIG. 6) is configured to send a message including a response to the first indication to the first device, where the response to the first indication indicates whether the second device is allowed to use the first mode to encode the data.

The first receiving module 601 is configured to receive a message that is sent by the first device and that includes the first indication.

The second receiving module (not shown in FIG. 6) is configured to receive a message that is sent by the first device and that includes the second indication.

The third sending module (not shown in FIG. 6) is configured to send a message including the response to the first indication to the first device.

The message includes: a capability field, a control field, and a check field. The capability field is used to carry the first capability information. The control field is used to carry the first indication, the response to the first indication, the second indication, or the response to the second indication. The check field is used to carry the first check information.

Optionally, the message may include: a TSB message.

Optionally, the first status parameter includes: a pre-correction bit error rate.

Optionally, the error detection and correction mode includes an FEC mode.

It should be understood that actions performed by at least some of the plurality of modules mentioned above may be completed by a same module, and correspondingly, the at least some modules may be integrated into one module. For example, the first receiving module and the second receiving module may be integrated into one receiving module. The first encoding module and the second encoding module may be integrated into one encoding module. The first determining module and the second determining module may be integrated into one determining module. The first sending module, the second sending module, the third sending module, the fourth sending module, the fifth sending module, the sixth sending module, and the seventh sending module may be integrated into one sending module. In addition, the plurality of determining modules mentioned above and the switching module may be integrated into one control module, which is configured to control selection of an error detection and correction mode. This is not limited in this application.

In conclusion, an embodiment of this application provides a data processing apparatus. The data processing apparatus may be used in a second device. The second device may send the first capability information to the first device, so that the first device can determine error detection and correction modes supported by both parties. The second device may perform encoding by using the first mode based on an indication of the first device, and the first device performs decoding by using the first mode, thereby implementing error detection and correction of transmitted data. In the method provided in this embodiment of this application, the first device and the second device may support a plurality of error detection and correction modes, and may determine a used error detection and correction mode based on the status parameter of the data link, so that application of the error detection and correction technology is more flexible.

In addition, after the data transmission is performed by using the first mode, the first device may further detect the second status parameter of the data link in the process of the data transmission, and may switch the first mode to the second mode based on the indication of the first device when the second status parameter does not match the first mode. In the process of the data transmission, an error detection and correction mode is switched based on the status of the current data link, which is more flexible, and helps improve performance of the data transmission system.

It should be noted that, in embodiments provided in this application, both the first device and the second device may serve as both a transmitting end and a receiving end. Therefore, both the first device and the second device may include modules in the data processing apparatus 50 and the data processing apparatus 60. In addition, in an implementation, determining and switching of the error detection and correction mode of the transmitting end and determining and switching of the error detection and correction mode of the receiving end may be performed by a same module.

For example, that the error detection and correction mode is an FEC mode is used as an example. A device that serves as both the transmitting end and the receiving end may include an FEC switch circuit. The FEC switch circuit may selectively enable an FEC circuit in the FEC mode based on the FEC mode that needs to be used, so that the device may perform encoding and/or decoding through the FEC circuit by using the FEC mode.

It may be clearly understood by a person skilled in the art that, for the purpose of convenient and brief description, for the foregoing detailed working processes of the communication device and the modules, refer to the corresponding processes in the foregoing method embodiment, and details are not described herein again.

It should be understood that the data processing device provided in this embodiment of this application may alternatively be implemented by using an application-specific integrated circuit (ASIC), or a programmable logic device (PLD). The PLD may be a complex programmable logical device (CPLD), a field-programmable gate array (FPGA), a generic array logic (GAL), or any combination thereof. Alternatively, the data processing method provided in the foregoing method embodiment may be implemented by software. When the data processing method provided in the foregoing method embodiment is implemented by software, modules in the data processing device may also be software modules.

Figure 7:
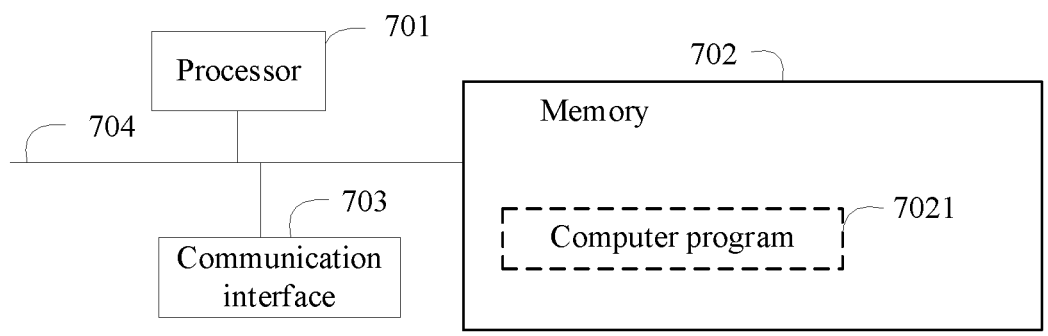
FIG. 7 is a schematic diagram of a structure of still another data processing apparatus according to an embodiment of this application.

FIG. 7 is a schematic diagram of a structure of still another data processing apparatus according to an embodiment of this application. The data processing apparatus may be used in the data transmission system provided in embodiments of this application. The data processing apparatus may be the first device in the foregoing embodiment, or may be the second device in the foregoing embodiment.

Referring to FIG. 7, the communication device may include: a processor 701, a memory 702, a communication interface 703, and a bus 704. The bus 704 is configured to connect the processor 701, the memory 702, and the communication interface 703. A communication connection to another device may be implemented by the communication interface 703 (which may be wired or wireless). The memory 702 stores a computer program 7021. The computer program 7021 is configured to implement various application functions. When modules in the communication device shown in FIG. 5 or FIG. 6 are implemented by software modules, programs corresponding to the software modules may be stored in the memory 702 of the communication device.

It should be understood that in this embodiment of this application, the processor 701 may be a CPU. Alternatively, the processor 701 may be another general-purpose processor, a digital signal processor (DSP), an application-specific integrated circuit (ASIC), a field programmable gate array (FPGA), a GPU, another programmable logic device, a discrete gate or transistor logic device, a discrete hardware component, or the like. The general-purpose processor may be a microprocessor or any conventional processor or the like.

The processor 701 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), a general-purpose array logic (GAL), or any combination thereof.

The memory 702 may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), a compact disc read-only memory (CD-ROM), a flash memory, a hard disk drive (HDD), a solid-state drive (SSD) or a flash. The volatile memory may be a random access memory (RAM), which is used as an external cache. By way of example but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). The memory 702 may further include any combination of the foregoing types of memories.

In addition to a data bus, the bus 704 may further include a power bus, a control bus, a status signal bus, and the like. However, for clarity of description, various buses are marked as the bus 704 in the figure.

An embodiment of this application further provides a computer-readable storage medium. The computer-readable storage medium stores instructions. When the computer-readable storage medium is run on a computer, the computer is enabled to perform the data processing method provided in the foregoing method embodiment.

An embodiment of this application further provides a computer program product including instructions. When the computer program product is run on a computer, the computer is enabled to perform the data processing method provided in the foregoing method embodiment.

All or some of embodiments described above may be implemented by software, hardware, firmware, or any combination thereof. When the software is used for implementation, all or some of embodiments described above may be implemented in a form of the computer program product. The computer program product includes one or more computer instructions. When the computer program instructions are loaded or executed on a computer, all or some of the procedures or functions based on embodiments of this application are generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from a website site, computer, server, or data center to another website, computer, server, or data center through wired means (for example, a coaxial cable, an optical fiber, a digital subscriber line (DSL)) or wireless means (for example, infrared, wireless, or microwave). The computer-readable storage medium may be any available medium that can be accessed by a computer, or a data storage device such as a server or a data center that includes a set of one or more available media. The available medium may be a magnetic medium (for example, a floppy disk, a hard disk, or a magnetic tape), an optical medium (for example, a DVD), or a semiconductor medium. The semiconductor medium may be a solid-state disk (SSD).

These computer program instructions may also be stored in a computer-readable memory that directs a computer or another programmable data processing device to operate in a particular manner, so that the instructions stored in the computer-readable memory produce an article of manufacture including an instruction apparatus. The instruction apparatus implements a specified function in one or more processes of the flowcharts and/or in one or more blocks of the block diagrams.

These computer program instructions may also be loaded onto a computer or another programmable data processing device, so that a series of operational steps are performed on the computer or another programmable device to produce computer-implemented processing. Therefore, instructions executed on the computer or another programmable device provide steps used to implement a function specified in one or more procedures of the flowcharts and/or in one or more blocks of the block diagrams.

The foregoing descriptions are merely some detailed implementations of this application, but are not intended to limit the protection scope of this application. Any person skilled in the art may make other changes or modifications to these embodiments within the technical scope disclosed in this application. Accordingly, the appended claims are intended to be construed as including embodiments described above and as changes and modifications that fall within the scope of this application. Therefore, the protection scope of this application shall be subject to the protection scope of the claims.

In this application, terms such as "first" and "second" are used to distinguish same items or similar items that have basically same effects and functions. It should be understood that there is no logical or time sequence dependency between "first", "second", and "nth". The quantity and execution sequence are not limited. It should also be understood that although the following description uses terms such as first, second, to describe various elements, these elements shall not be limited by the terms. These terms are simply used to distinguish one element from another. For example, without departing from the scope of the various described examples, a first device may be referred to as a second device, and similarly, a second device may be referred to as a first device.

In this application, the term "at least one" means one or more, and the term "a plurality of" means two or more. For example, a plurality of communication devices means two or more communication devices. In this application, the term "and/or" means either one of "and" and "or". The terms "system" and "network" are often used interchangeably herein.

The foregoing descriptions are merely optional implementations of this application, but are not intended to limit the protection scope of this application. Any person skilled in the art can easily figure out various equivalent modifications or replacements within the technical scope disclosed in this application. These modifications or replacements shall fall within the protection scope of this application. Therefore, the protection scope of this application shall be subject to the protection scope of the claims.

What is claimed is:

1. A method, applied to a first device, wherein the method comprises:
   obtaining a first status parameter of a data link between the first device and a second device;
   determining a first mode from a plurality of error detection and correction modes based on the first status parameter;
   sending a first indication to the second device, wherein the first indication indicates to the second device to encode data by using the first mode to generate encoded data;
   receiving, from the second device, a first response to the first indication, wherein the first response to the first indication indicates whether the second device is allowed to use the first mode to encode the data based on a mode selection condition; and decoding the encoded data by using the first mode.

2. The method according to claim 1, wherein the plurality of error detection and correction modes are in a one-to-one correspondence with a plurality of parameter ranges, and the determining the first mode from the plurality of error detection and correction modes based on the first status parameter comprises:
- determining, from the plurality of parameter ranges, a first parameter range within which the first status parameter falls; and
- determining that an error detection and correction mode corresponding to the first parameter range is the first mode.

3. The method according to claim 2, wherein after the decoding the encoded data by using the first mode, the method further comprises:
- obtaining a second status parameter of the data link;
- based on that the second status parameter is beyond the first parameter range, determining, from the plurality of parameter ranges, a second parameter range within which the second status parameter falls;
- determining that a second error detection and correction mode corresponding to the second parameter range is a second mode; and
- sending a second indication to the second device, wherein the second indication indicates to the second device to encode second data by using the second mode to generate second encoded data;
- switching the first mode to the second mode; and
- decoding the second encoded data by using the second mode.

4. The method according to claim 3, wherein before the decoding the second encoded data by using the second mode, the method further comprises:
- receiving, from the second device, a second response to the second indication, wherein the second response to the second indication indicates whether the second device is allowed to use the second mode to encode the second data, and
- wherein the switching from the first mode to the second mode comprises:
- switching the first mode to the second mode based on that the second response to the second indication indicates that the second device is allowed to use the second mode.

5. The method according to claim 3, wherein before the decoding the encoded data by using the first mode, the method further comprises:
- receiving the encoded data sent by the second device and obtained by encoding the data by using the first mode, wherein the encoded data carries second check information,
- wherein the obtaining the second status parameter of the data link comprises:
- obtaining the second status parameter based on the second check information carried in the encoded data.

6. The method according to claim 4, wherein the method further comprises:
- before the obtaining the first status parameter of the data link between the first device and the second device, receiving a first message sent by the second device, the first message comprising first check information;
- before the determining the first mode from the plurality of error detection and correction modes based on the first status parameter, receiving a second message sent by the second device, the second message comprising first capability information, wherein the first capability information indicates the second error detection and correction mode supported by the second device; and
- determining the plurality of error detection and correction modes based on the first capability information and a first error detection and correction mode supported by the first device, wherein the plurality of error detection and correction modes belong to error detection and correction modes supported by both the first device and the second device,
- wherein the obtaining the first status parameter of the data link between the first device and the second device comprises:
- obtaining the first status parameter based on the first check information, wherein the decoding the encoded data by using the first mode comprises:
- decoding the encoded data by using the first mode based on that the first response to the first indication indicates that the second device is allowed to use the first mode,
- wherein the sending the first indication to the second device comprises:
- sending a fourth message comprising the first indication to the second device,
- wherein the sending the second indication to the second device comprises:
- sending a fifth message comprising the second indication to the second device,
- wherein the receiving the second response to the second indication comprises:
- receiving a sixth message that is sent by the second device, the sixth message comprising the second response to the second indication, and
- wherein a capability field carries the first capability information, a control field carries the first indication, the first response to the first indication, the second indication, or the second response to the second indication, and a check field is used to carry the first check information.

7. The method according to claim 1, wherein before the determining the first mode from the plurality of error detection and correction modes based on the first status parameter, the method further comprises:
- receiving first capability information sent by the second device, wherein the first capability information indicates a second error detection and correction mode supported by the second device; and
- determining the plurality of error detection and correction modes based on the first capability information and a first error detection and correction mode supported by the first device, wherein the plurality of error detection and correction modes belong to error detection and correction modes supported by both the first device and the second device.

8. The method according to claim 1,
wherein the decoding the encoded data by using the first mode comprises:
- decoding the encoded data by using the first mode based on that the first response to the first indication indicates that the second device is allowed to use the first mode.

9. The method according to claim 1, wherein before the obtaining the first status parameter of the data link between the first device and the second device, the method further comprises:
- receiving a message sent by the second device, the message comprising first check information, and wherein the obtaining the first status parameter of the data link between the first device and the second device comprises:
obtaining the first status parameter based on the first check information.

10. The method according to claim 9, wherein the message comprises a training set block (TSB) message.

11. The method according to claim 1, wherein the first status parameter comprises a pre-correction bit error rate.

12. The method according to claim 1, wherein an error detection and correction mode of the plurality of error detection and correction modes comprises a forward error correction (FEC) mode.

13. The method of claim 1,
wherein the plurality of error detection and correction modes includes at least 4 error detection and correction modes in a one-to-one correspondence with at least 4 parameter ranges,
wherein the encoded data includes a plurality of data blocks, a respective alignment marker (AM) after each data block of the plurality of data blocks carrying respective check information of a corresponding data block, and
wherein the mode selection condition includes whether a data transmission rate is at a threshold giga transactions per second (GT/s) or above.

14. A method, applied to a second device, wherein the method comprises:
receiving a first indication sent by a first device, wherein the first indication indicates to the second device to encode data by using a first mode;
determining, based on a mode selection condition, whether the first mode is allowed to be used to encode the data; and
sending a first response to the first indication to the first device, wherein the first response to the first indication indicates whether the second device is allowed to use the first mode to encode the data; and
encoding the data by using the first mode based on the first indication.

15. The method according to claim 14, wherein after the encoding the data by using the first mode, the method further comprises:
receiving a second indication sent by the first device, wherein the second indication indicates to the second device to encode second data by using a second mode;
switching the first mode to the second mode; and
encoding the second data by using the second mode.

16. The method according to claim 14, wherein before the encoding the second data by using the second mode, the method further comprises:
determining, based on the mode selection condition, whether the second mode is allowed to be used to encode the second data; and
sending a second response to the second indication to the first device, wherein the second response to the second indication indicates whether the second device is allowed to use the second mode to encode the second data, and
wherein the switching from the first mode to the second mode comprises:
switching the first mode to the second mode based on that the second mode is allowed to be used to encode the second data.

17. The method according to claim 15, wherein before the encoding the second data by using the second mode, the method further comprises:
sending first capability information to the first device, wherein the first capability information indicates an error detection and correction mode supported by the second device.

18. The method according to claim 15, wherein after the encoding the data by using the first mode, the method further comprises:
sending encoded data that is obtained by encoding the data by using the first mode to the first device, wherein the encoded data carries second check information.

19. The method according to claim 14,
wherein the encoding the data by using the first mode comprises:
encoding the data by using the first mode based on that the first mode is allowed to be used to encode the data.

20. The method according to claim 14, wherein before the receiving the first indication sent by the first device, the method further comprises:
sending a message comprising first check information to the first device.

21. An apparatus, comprising:
a processor and a memory, and the processor is configured to execute a program stored in the memory to cause the apparatus to perform operations including:
obtaining a first status parameter of a data link between the apparatus and a second device;
determining a first mode from a plurality of error detection and correction modes based on the first status parameter;
sending a first indication to the second device, wherein the first indication indicates to the second device to encode data by using the first mode to generate encoded data;
receiving, from the second device, a first response to the first indication, wherein the first response to the first indication indicates whether the second device is allowed to use the first mode to encode the data based on a mode selection condition; and
decoding the encoded data by using the first mode.

* * * * *

UNITED STATES PATENT AND TRADEMARK OFFICE
CERTIFICATE OF CORRECTION

| | | |
|---|---|---|
| PATENT NO. | : 12,321,227 B2 | Page 1 of 1 |
| APPLICATION NO. | : 18/462497 | |
| DATED | : June 3, 2025 | |
| INVENTOR(S) | : Nie et al. | |

It is certified that error appears in the above-identified patent and that said Letters Patent is hereby corrected as shown below:

In the Claims

In Column 29, Claim 16, Line 49, delete "claim 14," and insert -- claim 15, --.

Signed and Sealed this
Fifteenth Day of July, 2025

Coke Morgan Stewart
*Acting Director of the United States Patent and Trademark Office*